United States Patent
Li et al.

(10) Patent No.: US 10,635,388 B2
(45) Date of Patent: *Apr. 28, 2020

(54) SOUND EFFECT PROCESSING METHOD AND MOBILE TERMINAL

(71) Applicant: GUANGDONG OPPO MOBILE TELECOMMUNICATIONS CORP., LTD., Dongguan, Guangdong (CN)

(72) Inventors: Yajun Li, Dongguan (CN); Gaoting Gan, Dongguan (CN); Guang Tu, Dongguan (CN); Hai Yang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/074,012

(22) PCT Filed: Jun. 8, 2017

(86) PCT No.: PCT/CN2017/087554
§ 371 (c)(1),
(2) Date: Jul. 30, 2018

(87) PCT Pub. No.: WO2017/215507
PCT Pub. Date: Dec. 21, 2017

(65) Prior Publication Data
US 2019/0042179 A1    Feb. 7, 2019

(30) Foreign Application Priority Data
Jun. 16, 2016  (CN) .......................... 2016 1 0440056

(51) Int. Cl.
*G06F 17/00* (2019.01)
*G06F 3/16* (2006.01)
(Continued)

(52) U.S. Cl.
CPC ............... *G06F 3/165* (2013.01); *G06F 3/16* (2013.01); *H04R 3/00* (2013.01); *H04M 1/60* (2013.01); *H04R 2499/11* (2013.01)

(58) Field of Classification Search
CPC ...................................................... G06F 3/165
See application file for complete search history.

(56) References Cited

U.S. PATENT DOCUMENTS

| 7,272,232 | B1 | 9/2007 | Donaldson | |
| 7,706,903 | B2* | 4/2010 | Champion | H03G 3/02 |
| | | | | 700/94 |

(Continued)

FOREIGN PATENT DOCUMENTS

| CN | 103559876 A | 2/2014 |
| CN | 103927146 A | 7/2014 |

(Continued)

OTHER PUBLICATIONS

International Search Report in international application No. PCT/CN2017/087554, dated Aug. 16, 2017.

(Continued)

*Primary Examiner* — Joseph Saunders, Jr.
(74) *Attorney, Agent, or Firm* — Ladas & Parry, LLP

(57) ABSTRACT

Embodiments of the present invention disclose a sound effect processing method and a mobile terminal. The method includes: obtaining, when a playing control instruction used for indicating an application of a mobile terminal to play a source audio file is detected, at least one frame of first data generated when the mobile terminal processes the source audio file by means of a global sound effect service; obtaining at least one frame of second data in a current playing process of the application; stopping the global sound effect service if the comparison result shows that the at least one frame of first data does not match with the at least one frame of second data; and playing a first audio file obtained by (Continued)

means of processing the source audio file only according to an application-level sound effect parameter of the application. Embodiments of the present invention also disclose a corresponding mobile terminal. By means of embodiments of the present invention, the fluency for playing an audio stream of a mobile terminal can be improved, memory resource management is optimized, and user experience is improved.

20 Claims, 5 Drawing Sheets

(51) Int. Cl.
*H04R 3/00* (2006.01)
*H04M 1/60* (2006.01)

(56) References Cited

U.S. PATENT DOCUMENTS

| | | |
|---|---|---|
| 8,300,841 B2 | 10/2012 | Lindahl |
| 8,768,494 B1 | 7/2014 | Stroud |
| 9,602,929 B2 | 3/2017 | Lindahl et al. |
| 2006/0274905 A1 | 12/2006 | Lindahl |
| 2008/0002831 A1 | 1/2008 | Donaldson |
| 2010/0246831 A1* | 9/2010 | Mahabub ............ G10L 19/018 381/17 |
| 2011/0106529 A1 | 5/2011 | Disch |
| 2013/0044883 A1 | 2/2013 | Lindahl et al. |
| 2014/0358262 A1* | 12/2014 | Yerrace ............ G06F 16/60 700/94 |
| 2015/0055801 A1 | 2/2015 | Wu |
| 2018/0373489 A1 | 12/2018 | Gan et al. |

FOREIGN PATENT DOCUMENTS

| | | |
|---|---|---|
| CN | 104090766 A | 10/2014 |
| CN | 104735528 A | 6/2015 |
| CN | 104778067 A | 7/2015 |
| CN | 104811864 A | 7/2015 |
| CN | 106126172 A | 11/2016 |
| EP | 3407180 A1 | 11/2018 |

OTHER PUBLICATIONS

Written Opinion of the International Search Authority in international application No. PCT/CN2017/087554, dated Aug. 16, 2017.
English Translation of the Notification of the First Office Action of Chinese application No. 201610440056.8, dated Jul. 14, 2017.
Anonymous: "Solved: Annoying sound effects when controlling Spotify mobile using ipod controls—The Spotify Community", Feb. 20, 2012 (Feb. 20, 2012), XP055555214.
Anonymous :"Solved: Annoying sound effects when controlling Spotify mo . . . p. 6—The Spotify Community", Feb. 26, 2014 (Feb. 26, 2014), XP055555222.
Abbas Suterwala: "Managing Multiple Sound Sources in Android with Audio Focus Requesting Audio Focus for Your App", May 27, 2016 (May 27, 2016), XP055554978.
Supplementary European Search Report in the European application No. 17812618.1, dated Feb. 21, 2019.

\* cited by examiner

SOUND EFFECT PROCESSING METHOD AND MOBILE TERMINAL

RELATED APPLICATION

This application is an application under 35 U.S.C. 371 of International Application No. PCT/CN2017/087554 filed on Jun. 8, 2017, the entire contents of which are incorporated herein by reference.

CROSS-REFERENCE TO RELATED APPLICATIONS

The present application claims benefit of Chinese Patent Application 201610440056.8, filed on Jun. 16, 2016 and titled "sound effect processing method and mobile terminal," the contents of which are hereby incorporated by reference in its entirety.

TECHNICAL FIELD

The disclosure relates to the technical field of mobile terminals, and more particularly to a method and a mobile terminal for sound effect processing.

BACKGROUND

A sound effect is an effect achieved by a sound and refers to a sound added to enhance the sense of reality and atmosphere of a certain scene. The added sound may include a musical sound and an effect sound, for example, a digital sound effect, an environmental sound effect and a Moving Picture Experts Group Audio Layer-3 (MP3) sound effect (ordinary sound effect and professional sound effect).

At present, there have been many applications integrated with an audio playing function, for example, a music player like the TTPod and a video player like the Storm. Under a normal circumstance, a third-party application controlled to be installed in a mobile terminal by a user may usually have a sound effect setting function, that is, the user may preset a sound effect of a corresponding application through a control interface in the corresponding application and, in a subsequent using process, the mobile terminal may overlap the sound effect set by the user and a system sound effect (i.e., a global sound effect) of the mobile terminal and play an audio file configured with an overlapped sound effect.

SUMMARY

Embodiments of the disclosure provide a method and a mobile terminal for sound effect processing, so as to improve audio stream playing fluency of the mobile terminal, optimize memory resource management and improve a user experience.

According to a first aspect, the embodiments of the disclosure provide a method for sound effect processing. The method may include the following actions.

Responsive to detection of a playing control instruction configured to indicate an application of a mobile terminal to play a source audio file, at least one frame of first data generated when the mobile terminal processes the source audio file through global sound effect service is acquired.

At least one frame of second data in a current playing process of the application is acquired.

When determining that the at least one frame of the first data is mismatched with the at least one frame of the second data, the global sound effect service is disabled.

A first audio file obtained by processing the source audio file according to an application-level sound effect parameter of the application is played.

According to a second aspect, the embodiments of the disclosure provide a mobile terminal that includes functional modules. The functional modules are configured to execute part or all of the actions described in any method according to the first aspect of the embodiments of the disclosure.

According to a third aspect, the embodiments of the disclosure provide a mobile terminal that may include:

a processor, a memory, a communication interface and a communication bus, wherein the processor, the memory and the communication interface may be connected and communicate to each other through the communication bus.

The memory may store an executable program code, and the communication interface may be configured for wireless communication.

The processor may be configured to call the executable program code in the memory to execute part or all of the actions described in any method according to the first aspect of the embodiments of the disclosure.

BRIEF DESCRIPTION OF DRAWINGS

In order to describe the technical solutions in the embodiments of the disclosure or a conventional art more clearly, the drawings required to be used in descriptions about the embodiments or the conventional art will be simply introduced below. Obviously, the drawings in the following descriptions are only some embodiments of the disclosure. Those of ordinary skilled in the art may further obtain other drawings according to these drawings without creative work.

DETAILED DESCRIPTION

Figure 1:
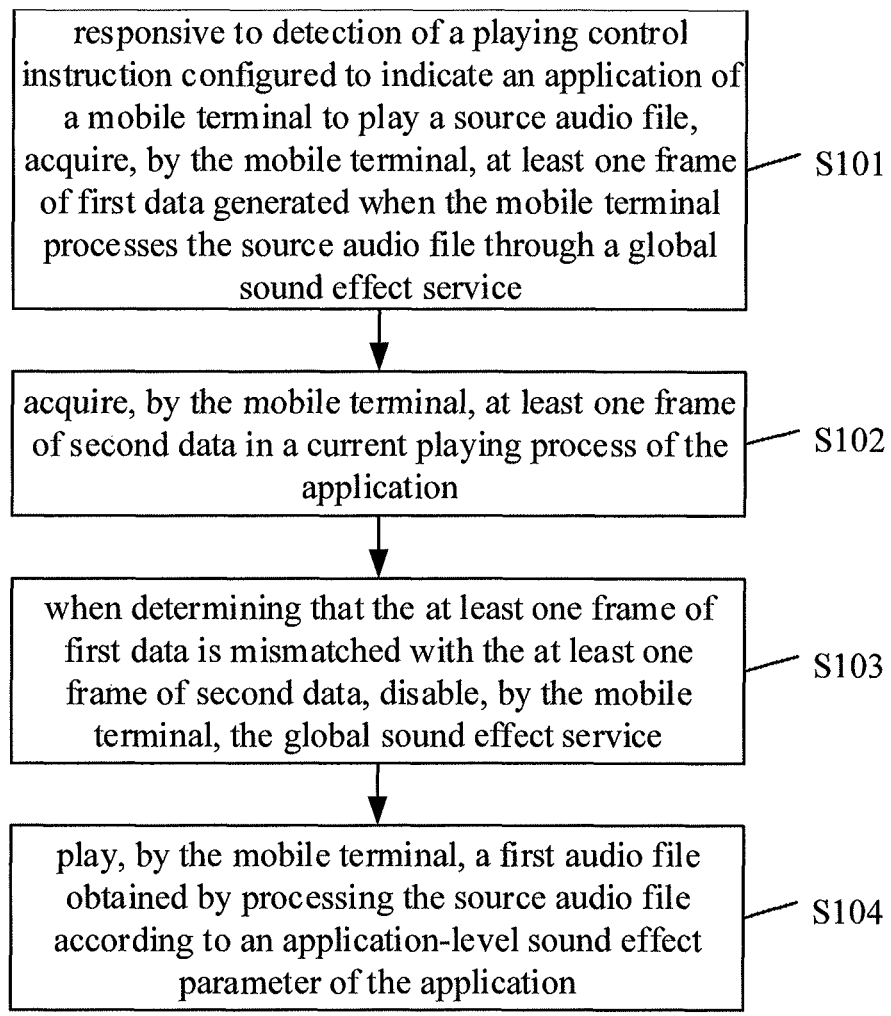
FIG. 1 is a flowchart of a method for sound effect processing according to an embodiment of the disclosure.

In order to make the solutions of the disclosure better understood by those skilled in the art, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted not to describe a specific sequence but to distinguish similar objects. In addition, terms "include" and "have" and any transformation thereof are intended to cover nonexclusive inclusions. For example, a process, method, system, product or equipment including a series of steps or units is not limited to the steps or units which are listed, but may optionally further include steps or units which are not listed or optionally further include other steps or units intrinsic to the process, the method, the product or the equipment.

"Embodiment" mentioned in the disclosure means that a specific characteristic, structure or property described in combination with the embodiment may be included in at least one embodiment of the disclosure. Appearance of this phrase at each position in the specification may not always refer to the same embodiment as well as an independent or alternative embodiment mutually exclusive with the other embodiments. Those skilled in the art explicitly and implicitly understand that the embodiments described in the disclosure may be combined with the other embodiments.

In order to better understand a method and mobile terminal for sound effect processing disclosed by the embodiments of the disclosure, related concepts involved in the embodiments of the disclosure are briefly introduced at first. A mobile terminal is usually preset with a system sound effect by a developer when being delivered, the system sound effect is a global sound effect, the global sound effect may be configured to configure all audio files acquired by the mobile terminal, and the global sound effect may be updated through functions of system setting and the like in a using process of a user. Generally speaking, the mobile terminal may configure the global sound effect for an audio file by calling global sound effect configuration service in a system. In addition, when the mobile terminal is installed with an audio playing application, if the application is preset with an application-level sound effect, i.e., a built-in sound effect, when the application is started, the application-level sound effect may be configured for an audio file through independent sound effect configuration service of the application, the audio file configured with the application-level sound effect may be transmitted to a system audio library of the mobile terminal, the system-level sound effect configuration service superimposes an audio file in the system audio library over the audio file generated by the global sound effect configuration service so as to generate an audio file to be played, and a playing process of the application calls the audio file to be played for playing.

For a solution for sound effect processing in the conventional art, the embodiments of the disclosure provide a method for sound effect processing. The embodiments of the disclosure will be introduced below in detail.

Referring to FIG. 1, FIG. 1 is a method for sound effect processing according to an embodiment of the disclosure. As shown in the figure, the method for sound effect processing includes the following actions.

In S101, responsive to detection of a playing control instruction configured to indicate an application of a mobile terminal to play a source audio file, the mobile terminal acquires at least one frame of first data generated when the mobile terminal processes the source audio file through global sound effect service.

In some embodiments of the disclosure, an implementation manner for the action that the mobile terminal detects the playing control instruction configured to indicate the application of the mobile terminal to play the source audio file may be as follows.

Responsive to detection of a first selection operation for the source audio file of the mobile terminal, the mobile terminal outputs a player selection interface including the application.

Responsive to detection of a second selection operation for the application in the player selection interface, the mobile terminal generates the playing control instruction configured to indicate the application to play the source audio file.

The first selection operation and the second selection operation may be, for example, touch operations and voice control operations, which will not be limited in the disclosure.

A specific implementation manner for the action that the mobile terminal processes the source audio file through the global sound effect service may be as follows.

The mobile terminal decodes the source audio file into a reference audio file. The mobile terminal configures the reference audio file through the global sound effect service according to a pre-stored global sound effect parameter.

The global sound effect parameter includes at least one of the following parameters: a Compress parameter, an Amp-Type parameter, an EQ_Bass parameter, an EQ_Mid parameter, an EQ_Treble parameter or a Noise_Gate parameter.

In at least one embodiment, the at least one frame of the first data is first frame data generated when the mobile terminal processes the source audio file through the global sound effect service.

In S102, the mobile terminal acquires at least one frame of second data in a current playing process of the application.

When the at least one frame of the first data is the first frame data generated when the mobile terminal processes the source audio file through the global sound effect service, the at least one frame of the second data is first frame data acquired by the current playing process of the application.

The second data played in the current playing process of the application may be obtained by the following actions.

Responsive to detection of the application being preset with the application-level sound effect parameter, the mobile terminal configures the source audio file by using a sound effect configuration process or thread of the application according to the application-level sound effect parameter of the application to generate third data, and a sound effect configuration service of the mobile terminal acquires the first data and the third data, and superimposes the first data over the third data to obtain the second data.

Or, responsive to detection of the application not being preset with the application-level sound effect parameter, the mobile terminal acquires the global sound effect parameter of the mobile terminal and configures the source audio file by using the sound effect configuration process or thread of the application according to the global sound effect parameter to generate the third data, and the sound effect configuration service of the mobile terminal acquires the first data and the third data and superimposes the first data over the third data to obtain the second data. The first data, the second data and the third data are the same.

The application-level sound effect parameter is a customized sound effect parameter of the application and includes at least one of: a Compress parameter, an Amp-Type parameter, an EQ_Bass parameter, an EQ_Mid parameter, an EQ_Treble parameter or a Noise_Gate parameter.

In S103, when determining that the at least one frame of the first data is mismatched with the at least one frame of the second data, the mobile terminal disables the global sound effect service.

The source audio file may be, for example, a prompt tone file, a background sound file, a song file or a communication sound file.

In S104, the mobile terminal plays a first audio file obtained by processing the source audio file according to an application-level sound effect parameter of the application.

It can be seen that, compared with a solution that the mobile terminal superimposes a global sound effect of a system of the mobile terminal over own application-level sound effect of the application in the conventional art, the embodiment of the disclosure has the advantages that the mobile terminal samples data processed by the global sound effect service and data in the current playing process of the application, disables the global sound effect service under the condition that it is determined by comparison that the two types of data are mismatched and plays the first audio file obtained only by processing the source audio file according to the application-level sound effect parameter of the application, so that the mobile terminal may avoid superimposed configuration of the global sound effect and own application-level sound effect of the application for the source audio file, multiple sound effects are further eliminated, intelligence in sound effect processing of the mobile terminal is improved, and a good auditory experience is brought to a user.

Optionally, in some embodiments of the disclosure, an implementation manner for the action that the mobile terminal acquires the at least one frame of the first data generated when the mobile terminal processes the source audio file through the global sound effect service may be as follows.

The mobile terminal determines whether the application belongs to a preset application set. When determining that the application does not belong to the preset application set, the at least one frame of the first data generated when the mobile terminal processes the source audio file through the global sound effect service is acquired.

Correspondingly, after the mobile terminal disables the global sound effect service and before the first audio file obtained by processing the source audio file according to the application-level sound effect parameter of the application, the following action is further executed.

The application is added into the preset application set.

Furthermore, optionally, in some embodiments of the disclosure, the mobile terminal further executes the following actions.

When determining that the application belongs to the preset application set, the mobile terminal disables the global sound effect service and plays the first audio file obtained by processing the source audio file according to the application-level sound effect parameter of the application.

It can be seen that, in an optional embodiment of the disclosure, the mobile terminal adds the application preset with the application-level sound effect parameter into the preset application set and, in such a manner, when the user reuses the application for processing the source audio file, the mobile terminal may directly judge that the application belongs to the preset application set, directly disable the global sound effect service and play the first audio file obtained only by processing the source audio file according to the application-level sound effect parameter of the application, so that convenience and intelligence in sound effect management are further improved.

Figure 2:
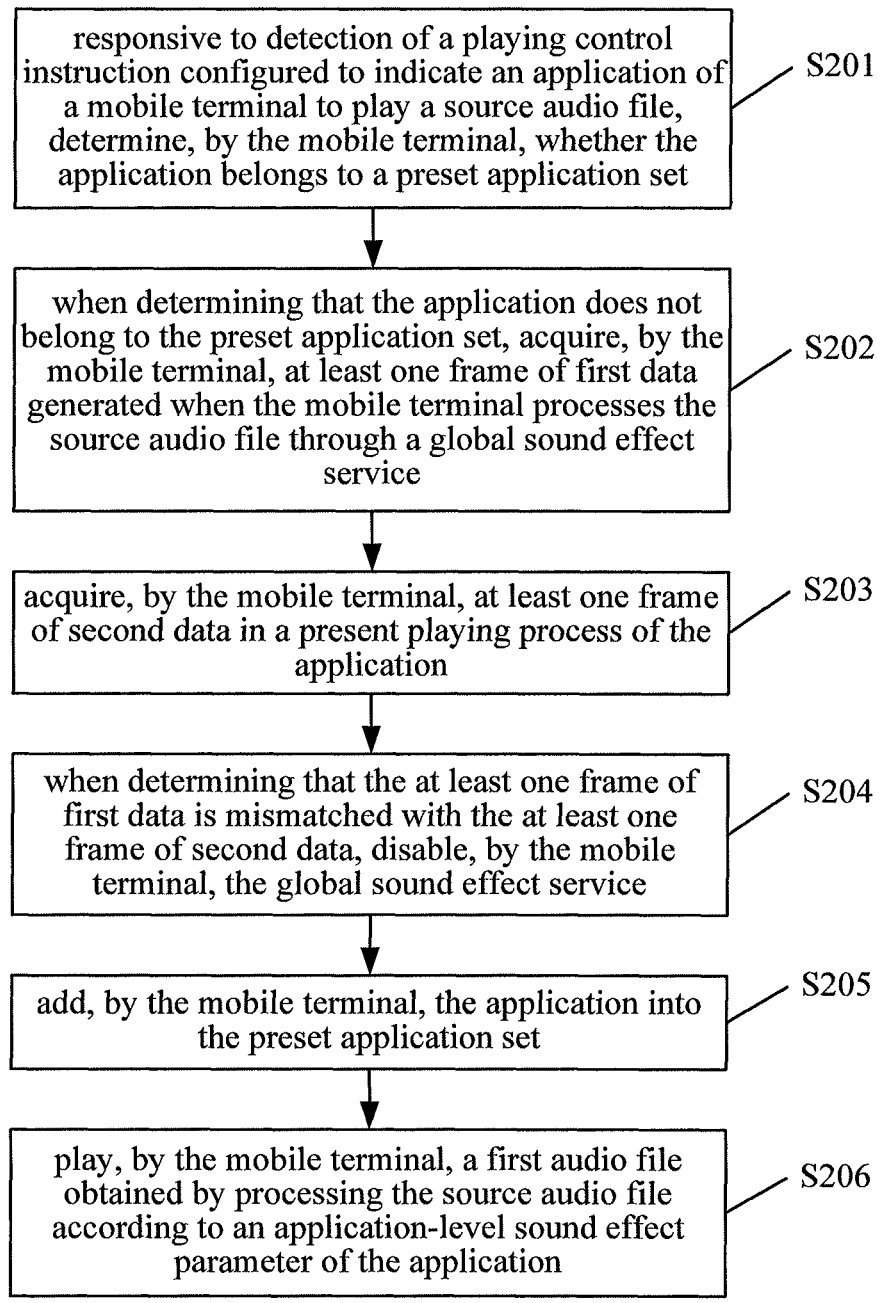
FIG. 2 is a flowchart of another method for sound effect processing according to an embodiment of the disclosure.

Consistent with the embodiment shown in FIG. 1, referring to FIG. 2, FIG. 2 is a flowchart of another method for sound effect processing according to an embodiment of the disclosure. As shown in the figure, the method for sound effect processing includes the following actions.

In S201, responsive to detection of a playing control instruction configured to indicate an application of a mobile terminal to play a source audio file, the mobile terminal determines whether the application belongs to a preset application set.

In S202, when determining that the application does not belong to the preset application set, the mobile terminal acquires at least one frame of first data generated when the mobile terminal processes the source audio file through a global sound effect service.

In S203, the mobile terminal acquires at least one frame of second data in a current playing process of the application.

In S204, when determining that the at least one frame of the first data is mismatched with the at least one frame of the second data, the mobile terminal disables the global sound effect service.

In S205, the mobile terminal adds the application into the preset application set.

In S206, the mobile terminal plays a first audio file obtained by processing the source audio file according to an application-level sound effect parameter of the application.

It can be seen that, compared with a solution that the mobile terminal superimposes a global sound effect of a system of the mobile terminal over own application-level sound effect of the application in the conventional art, the embodiment of the disclosure has the advantages that the mobile terminal samples data processed by the global sound effect service and data in the current playing process of the application, disables the global sound effect service under the condition that it is determined by comparison that the two types of data are mismatched and plays the first audio file obtained only by processing the source audio file according to the application-level sound effect parameter of the application, so that the mobile terminal may avoid superimposed configuration of the global sound effect and own application-level sound effect of the application for the source audio file, multiple sound effects are further eliminated, intelligence in sound effect processing of the mobile terminal is improved, and a good auditory experience is brought to a user.

Figure 3:
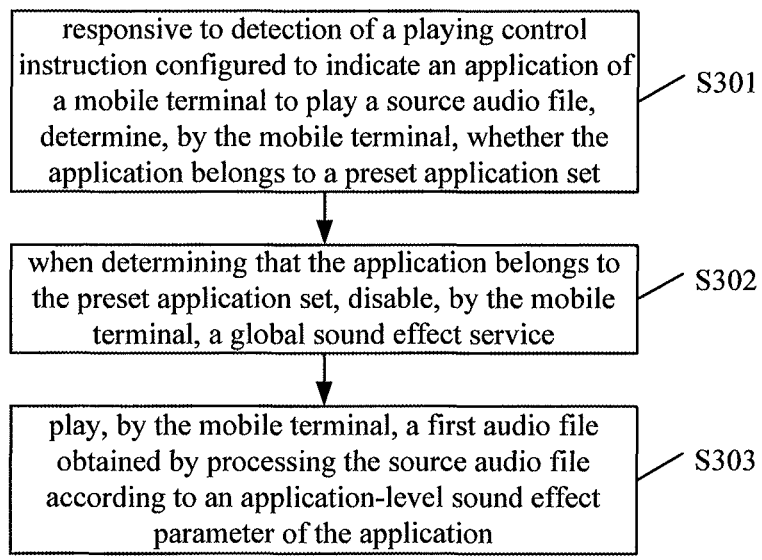
FIG. 3 is a flowchart of another method for sound effect processing according to an embodiment of the disclosure.

Consistent with the embodiments shown in FIG. 1 and FIG. 2, referring to FIG. 3, FIG. 3 is a flowchart of another method for sound effect processing according to an embodiment of the disclosure. As shown in the figure, the method for sound effect processing includes the following actions.

In S301, responsive to detection of a playing control instruction configured to indicate an application of a mobile terminal to play a source audio file, the mobile terminal judges whether the application belongs to a preset application set.

In S302, when determining that the application belongs to the preset application set, the mobile terminal disables global sound effect service.

In S303, the mobile terminal plays a first audio file obtained by processing the source audio file according to an application-level sound effect parameter of the application.

It can be seen that, compared with a solution that the mobile terminal superimposes a global sound effect of a system of the mobile terminal over own application-level sound effect of the application in the conventional art, the embodiment of the disclosure has the advantages that the mobile terminal samples data processed by the global sound effect service and data in a current playing process of the application, disables the global sound effect service under the condition that it is determined by comparison that the two types of data are mismatched and plays the first audio file obtained only by processing the source audio file according to the application-level sound effect parameter of the application, so that the mobile terminal may avoid superimposed configuration of the global sound effect and own application-level sound effect of the application for the source audio file, multiple sound effects are further eliminated, intelligence in sound effect processing of the mobile terminal is improved, and a good auditory experience is brought to a user.

Figure 4:
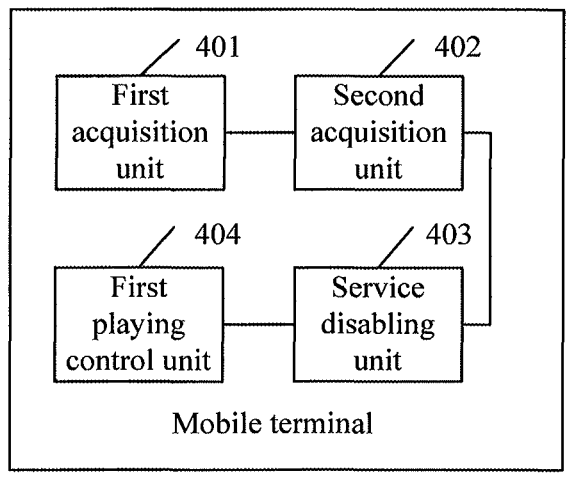
FIG. 4 is a composition block diagram of units of a mobile terminal according to an embodiment of the disclosure.

The below is a device embodiment of the disclosure. The device embodiment of the disclosure is used for executing the method implemented by the method embodiment of the disclosure. As shown in FIG. 4, a mobile terminal may include a first acquisition unit 401, a second acquisition unit 402, a service disabling unit 403 and a first playing control unit 404.

The first acquisition unit 401 is configured to, responsive to detection of a playing control instruction configured to indicate an application of a mobile terminal to play a source audio file, acquire at least one frame of first data generated when the mobile terminal processes the source audio file through a global sound effect service.

The second acquisition unit 402 is configured to acquire at least one frame of second data in a current playing process of the application.

The service disabling unit 403 is configured to, when determining that the at least one frame of the first data is mismatched with the at least one frame of the second data, disable the global sound effect service.

The first playing control unit 404 is configured to play a first audio file obtained by processing the source audio file according to an application-level sound effect parameter of the application.

Figure 5:
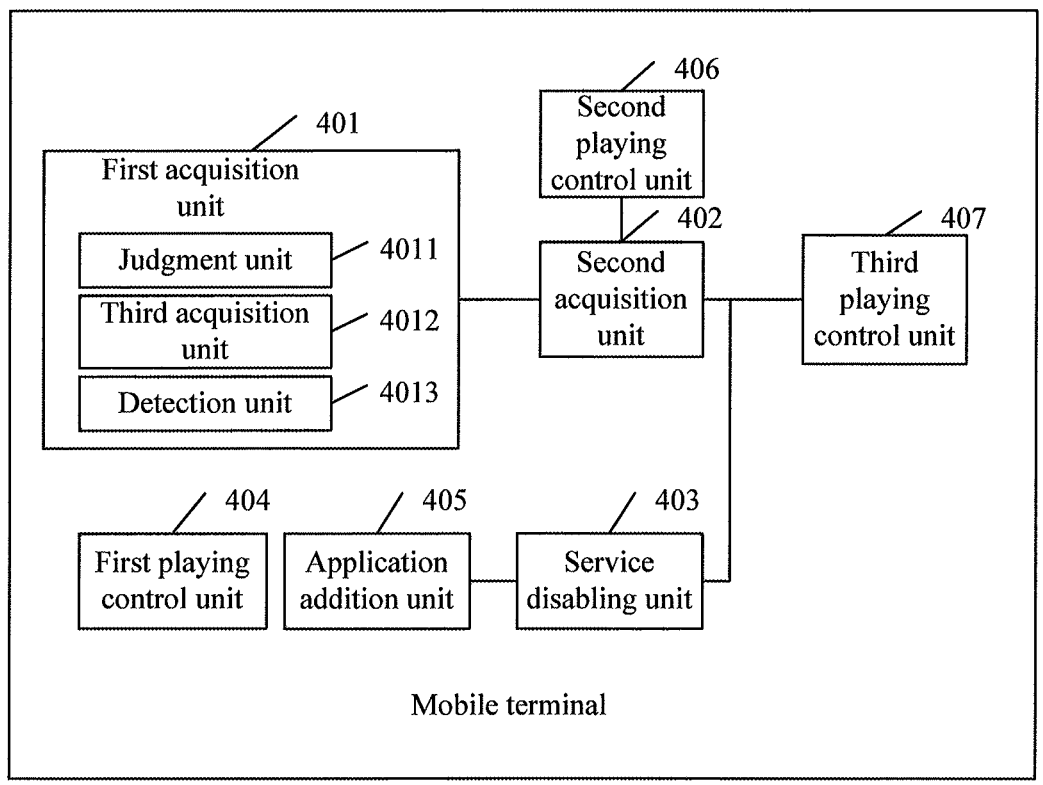
FIG. 5 is a composition block diagram of units of a mobile terminal according to an embodiment of the disclosure.

As shown in FIG. 5, a mobile terminal may include the first acquisition unit 401, second acquisition unit 402, service disabling unit 403 and first playing control unit 404 in the embodiment corresponding to FIG. 4.

Furthermore, the first acquisition unit 401 includes a judgment unit 4011 and a third acquisition unit 4012.

The judgment unit 4011 is configured to determine whether the application belongs to a preset application set.

The third acquisition unit 4012 is configured to, when the judgment unit determines that the application does not belong to the preset application set, acquire the at least one frame of the first data generated when the mobile terminal processes the source audio file through the global sound effect service.

The mobile terminal further includes an application addition unit 405.

The application addition unit 405 is configured to, after the service disabling unit 403 disables the global sound effect service and before the playing control unit 404 plays the first audio file obtained by processing the source audio file according to the application-level sound effect parameter of the application, add the application into the preset application set.

In at least one embodiment, the mobile terminal further includes a second playing control unit 406.

The second playing control unit 406 is configured to, when the judgment unit 4011 determines that the application belongs to the preset application set, disable the global sound effect service and play the first audio file obtained by processing the source audio file according to the application-level sound effect parameter of the application.

In at least one embodiment, the mobile terminal further includes a third playing control unit 407.

The third playing control unit 407 is configured to, when determining that the at least one frame of the first data is matched with the at least one frame of the second data, play a second audio file generated by processing the source audio file through the global sound effect service.

In at least one embodiment, on the aspect that the mobile terminal processes the source audio file through the global sound effect service, the first acquisition unit 401 is configured to:

decode the source audio file into a reference audio file; and configure the reference audio file through the global sound effect service according to a pre-stored global sound effect parameter.

In at least one embodiment, the global sound effect parameter or the application-level sound effect parameter includes at least one of the following parameters:

a Compress parameter, an Amp-Type parameter, an EQ_Bass parameter, an EQ_Mid parameter, an EQ_Treble parameter or a Noise_Gate parameter.

In at least one embodiment, the first acquisition unit 401 includes a detection unit 4013. The detection unit 4013 is configured to, responsive to detection of a first selection operation for the source audio file of the mobile terminal, output a player selection interface including the application, and responsive to detection of a second selection operation for the application in the player selection interface, generate the playing control instruction configured to indicate the application to play the source audio file.

In at least one embodiment, the second acquisition unit 402 is specifically configured to, responsive to detection of the application being preset with the application-level sound effect parameter, configure the source audio file by using a sound effect configuration process or thread of the application according to the application-level sound effect parameter of the application to generate third data, acquire, through sound effect configuration service of the mobile terminal, the first data and the third data, and superimposes the first data on the third data to obtain the second data;

or, responsive to detection of the application not being preset with the application-level sound effect parameter, acquire the global sound effect parameter of the mobile terminal, configure the source audio file by using the sound effect configuration process or thread of the application according to the global sound effect parameter to generate the third data, acquire, through the sound effect configuration service of the mobile terminal, the first data and the third data, and superimposes the first data over the third data to obtain the second data, where the first data, the second data and the third data are the same.

It should be noted that the mobile terminal described in the device embodiment of the disclosure is presented in form of functional unit. Term "unit" used herein should be understood as a meaning which is as broad as possible and an object configured to realize a described function of each "unit" may be, for example, an Application Specific Integrated Circuit (ASIC), a single circuit, a processor (shared, dedicated or chip unit) and memory configured to execute one or more software or firmware programs, a combined logical circuit and/or another proper component realizing the function.

Figure 6:
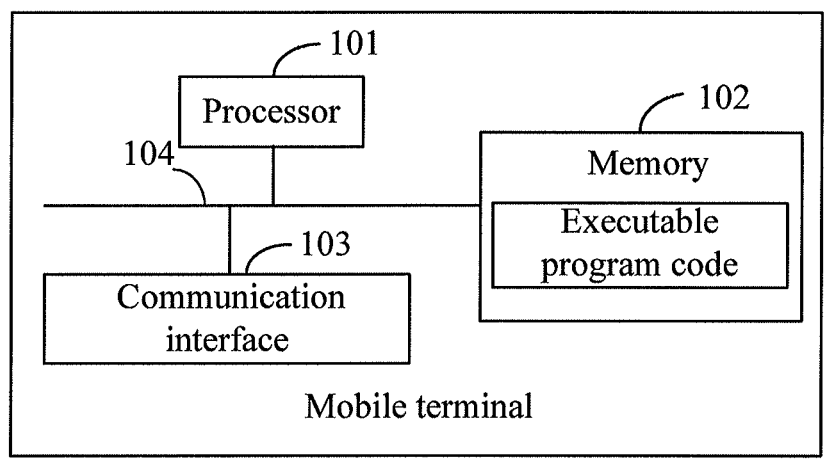
FIG. 6 is a structure diagram of a mobile terminal according to an embodiment of the disclosure.

For example, the function of the first acquisition unit 401 may be realized by a mobile terminal shown in FIG. 6, and specifically, a processor 101 may call an executable program code in a memory 102 to, responsive to detection of the playing control instruction configured to indicate the application of the mobile terminal to play the source audio file, acquire the at least one frame of the first data generated when the mobile terminal processes the source audio file through the global sound effect service.

It can be seen that, compared with a solution that the mobile terminal superimposes a global sound effect of a system of the mobile terminal over own application-level sound effect of the application in the conventional art, the embodiment of the disclosure has the advantages that the mobile terminal samples data processed by the global sound effect service and data in the current playing process of the application, disables the global sound effect service under the condition that it is determined by comparison that the two types of data are mismatched and plays the first audio file obtained only by processing the source audio file according to the application-level sound effect parameter of the application, so that the mobile terminal may avoid superimposed configuration of the global sound effect and own application-level sound effect of the application for the source audio file, multiple sound effects are further eliminated, intelligence in sound effect processing of the mobile terminal is improved, and a good auditory experience is brought to a user.

An embodiment of the disclosure further provides another mobile terminal, which, as shown in FIG. 6, includes: a processor 101, a memory 102, a communication interface 103 and a communication bus 104. The processor 101, the memory 102 and the communication interface 103 are connected and communicate to each other through the communication bus 104. The processor 101 controls wireless communication with an external cellular network through the communication interface 103. The communication interface 103 includes, but not limited to, an antenna, an amplifier, a transceiver, a coupler, a Low Noise Amplifier (LNA), a duplexer and the like. The memory 102 includes at least one of: a Random Access Memory (RAM), a non-volatile memory or an external memory. An executable program code is stored in the memory 102. The executable program code may guide the processor 101 to execute a method for sound effect processing disclosed in the method embodiment of the disclosure, including the following actions.

Responsive to detection of a playing control instruction configured to indicate an application of the mobile terminal to play a source audio file, the processor 101 acquires at least one frame of first data generated when the mobile terminal processes the source audio file through global sound effect service.

The processor 101 acquires at least one frame of second data in a current playing process of the application.

When determining that the at least one frame of the first data is mismatched with the at least one frame of the second data, the processor 101 disables the global sound effect service.

The processor 101 plays a first audio file obtained by processing the source audio file according to an application-level sound effect parameter of the application.

It can be seen that, compared with a solution that the mobile terminal superimposes a global sound effect of a system of the mobile terminal over own application-level sound effect of the application in the conventional art, the embodiment of the disclosure has the advantages that the mobile terminal samples data processed by the global sound effect service and data in the current playing process of the application, disables the global sound effect service under the condition that it is determined by comparison that the two types of data are mismatched and plays the first audio file obtained only by processing the source audio file according to the application-level sound effect parameter of the application, so that the mobile terminal may avoid superimposed configuration of the global sound effect and own application-level sound effect of the application for the source audio file, multiple sound effects are further eliminated, intelligence in sound effect processing of the mobile terminal is improved, and a good auditory experience is brought to a user.

An embodiment of the disclosure further provides another mobile terminal. As shown in FIG. 6, for convenient description, only parts related to the embodiment of the disclosure are shown, and specific technical details which are undisclosed refer to parts of the method of the embodiments of the disclosure. The mobile terminal may be any piece of terminal equipment including a mobile phone, a tablet computer, a Personal Digital Assistant (PDA), a Point of Sales (POS), a vehicle-mounted computer and the like. For example, the mobile terminal is a mobile phone.

Figure 7:
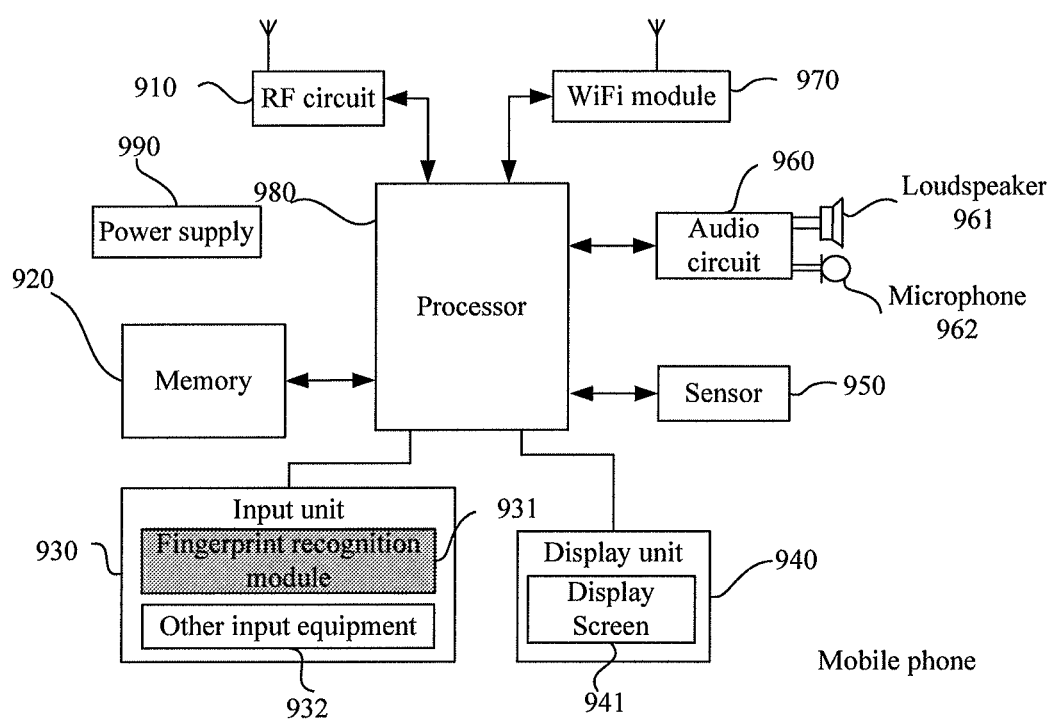
FIG. 7 is a structure diagram of another mobile terminal according to an embodiment of the disclosure.

FIG. 7 is a block diagram of part of a structure of a mobile phone related to a mobile terminal according to an embodiment of the disclosure. Referring to FIG. 7, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 7 is not intended to limit the mobile phone and may include components more or fewer than those shown in the figure or some components are combined or different component arrangements are adopted.

Each component of the mobile phone will be specifically introduced below in combination with FIG. 7.

The RF circuit 910 may be configured to receive and send information. The RF circuit 910 usually includes, but not limited to, an antenna, at least one amplifier, a transceiver, a coupler, an LNA, a duplexer and the like. In addition, the RF circuit 910 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 920 may be configured to store a software program and a module, and the processor 980 operates the software program and module stored in the memory 920, thereby executing various function applications and data processing of the mobile phone. The memory 920 may mainly include a program storage region and a data storage region, wherein the program storage region may store an operating system, an application program required by at least one function (for example, a data acquisition function and a data comparison function) and the like, and the data storage region may store data (for example, a global sound effect parameter and an application-level sound effect parameter) created according to use of the mobile phone and the like. In addition, the memory 920 may include a high-speed RAM, and may further include a non-volatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and other input equipment 932. The fingerprint recognition module 931 may collect fingerprint data of a user thereon. Optionally, the fingerprint recognition module 931 may include an optical fingerprint module, a capacitive fingerprint module and an RF fingerprint module. For example, the fingerprint recognition module 931 is a capacitive fingerprint recognition module including a sensing electrode (abnormity sensing electrode and normality sensing electrode) and a signal processing circuit (for example, an amplification circuit, a noise suppression circuit and an analogue-to-digital conversion circuit) connected with the sensing electrode. Besides the fingerprint recognition module 931, the input unit 930 may further include the other input equipment 932. Specifically, the other input equipment 932 may include, but not limited to, one or more of a physical keyboard, a function key (for example, a volume control key and an on-off key), a trackball, a mouse, a joystick and the like.

The display unit 940 may be configured to display information input by the user or information provided for the user and various menus of the mobile phone. The display unit 940 may include a display screen 941. Optionally, the display screen 941 may be configured in form of a Liquid Crystal Display (LCD), an Organic Light-Emitting Diode (OLED) and the like. Although the fingerprint recognition module 931 and display screen 941 in FIG. 7 realize input and output functions of the mobile phone as two independent components, the fingerprint recognition module 931 and the display screen 941 may be integrated to realize the input and output functions of the mobile phone in some embodiments.

The mobile phone may further include at least one sensor 950, for example, a light sensor, a motion sensor and another sensor. Specifically, the light sensor may include an environmental light sensor and a proximity sensor, wherein the environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960, a loudspeaker 961 and a microphone 962 may provide an audio interface between the user and the mobile phone. The audio circuit 960 may transmit an electric signal converted from received audio data to the loudspeaker 961, and then the loudspeaker 961 converts it into a sound signal for output. On the other aspect, the microphone 962 converts a collected sound signal into an electric signal, and then the audio circuit 960 receives and converts it into audio data and outputs the audio data to the processor 980 for processing and sending to, for example, another mobile phone through the RF circuit 910 or outputs the audio data to the memory 920 for further processing.

WiFi is a short-distance wireless communication technology. The mobile phone may help the user to receive and send an electronic mail, browse a webpage, access streaming media and the like through the WiFi module 970, and provides wireless broadband Internet access for the user. Although the WiFi module 970 is shown in FIG. 7, it can be understood that it is not a necessary component of the mobile phone and may completely be omitted according to a requirement without changing the scope of the essence of the disclosure.

The processor 980 is a control center of the mobile phone, connects each part of the whole mobile phone by using various interfaces and lines and executes various functions and data processing of the mobile phone by operating or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor, wherein the application processor mainly processes the operating system, a user interface, an application program and the like, and the modulation and demodulation processor mainly processes wireless communication. It can be understood that the modulation and demodulation processor may also not be integrated into the processor 980.

The mobile phone further includes the power supply 990 (for example, a battery) supplying power to each component. Preferably, the power supply may be logically connected with the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiments shown in FIG. 1, FIG. 2 and FIG. 3, each step of the method flows may be implemented on the basis of the structure of the mobile phone.

In the embodiment shown in FIG. 4 or FIG. 5, the function of each unit may be realized on the basis of the structure of the mobile phone.

An embodiment of the disclosure further provides a computer storage medium, wherein the computer storage medium may store a program, and when the program is executed, part or all of the actions of any method for sound effect processing recorded in the method embodiment are included.

It should be noted that, for simple description, each method embodiment is expressed into a combination of a series of actions. However, those skilled in the art should know that the disclosure is not limited by an action sequence described herein because some steps may be executed in another sequence or at the same time according to the disclosure. Second, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the steps of the method in each embodiment of the disclosure. The memory includes: various media capable of storing program codes such as a U disk, a Read-Only Memory (ROM), a RAM, a mobile hard disk, a magnetic disk or an optical disk.

Those of ordinary skilled in the art can understand that all or part of the steps in various methods of the embodiments may be completed by related hardware instructed by a program, the program may be stored in a computer-readable memory, and the memory may include a flash disk, a ROM, a RAM, a magnetic disk, an optical disk or the like.

The embodiments of the application are introduced above in detail, the principle and implementation modes of the disclosure are elaborated with specific examples in the disclosure, and the descriptions made to the embodiments are only adopted to help the method of the disclosure and the core concept thereof to be understood. In addition, those of ordinary skilled in the art may make variations to the specific implementation modes and the application scope according to the concept of the disclosure. From the above, the contents of the specification should not be understood as limits to the disclosure.

The invention claimed is:

1. A method for sound effect processing, comprising:
responsive to detection of a playing control instruction configured to indicate an application of a mobile terminal to play a source audio file, acquiring at least one frame of first data generated in response to the mobile terminal processing the source audio file through a global sound effect service;
acquiring at least one frame of second data in a current playing process of the application, wherein the at least one frame of the first data is a first frame data of the processed source audio file generated in response to the mobile terminal processing the source audio file through the global sound effect service, and the at least one frame of the second data is a first frame data acquired by the current playing process of the application, wherein in response to the application not being preset with an application-level sound effect parameter, the first data and the second data are the same;
in response to determining that the at least one frame of the first data is mismatched with the at least one frame of the second data, disabling the global sound effect service; and
playing a first audio file obtained by processing the source audio file according to the application-level sound effect parameter of the application.

2. The method according to claim 1, wherein
acquiring the at least one frame of the first data generated in response to the mobile terminal processing the source audio file through the global sound effect service comprises:
determining whether the application belongs to a preset application set; and
in response to determining that the application does not belong to the preset application set, acquiring the at least one frame of the first data generated in response to the mobile terminal processing the source audio file through the global sound effect service.

3. The method according to claim 2, further comprising:
in response to determining that the application belongs to the preset application set, disabling the global sound effect service, and playing the first audio file obtained by processing the source audio file according to the application-level sound effect parameter of the application.

4. The method according to claim 1, further comprising:
in response to determining that the at least one frame of the first data is matched with the at least one frame of the second data, playing a second audio file generated by processing the source audio file through the global sound effect service.

5. The method according to claim 1, wherein processing, by the mobile terminal, the source audio file through the global sound effect service comprises:
decoding the source audio file into a reference audio file; and
configuring the reference audio file through the global sound effect service according to a pre-stored global sound effect parameter.

6. The method according to claim 5, wherein the global sound effect parameter or the application-level sound effect parameter comprises at least one of the following parameters:
a Compress parameter, an Amp-Type (Amplifier-Type) parameter, an EQ_Bass parameter, an EQ_Mid parameter, an EQ_Treble parameter or a Noise_Gate parameter.

7. The method according to claim 5, wherein acquiring the at least one frame of the second data in the current playing process of the application comprises:
responsive to detection of the application being preset with the application-level sound effect parameter, configuring the source audio file by using a sound effect configuration process or thread of the application according to the application-level sound effect parameter of the application to generate third data, acquiring, through a sound effect configuration service of the mobile terminal, the first data and the third data, and superimposing the first data over the third data to obtain the second data;
or,
responsive to detection of the application not being preset with the application-level sound effect parameter, acquiring the global sound effect parameter of the mobile terminal, configuring the source audio file by using the sound effect configuration process or thread of the application according to the global sound effect parameter to generate the third data, acquiring, through the sound effect configuration service of the mobile terminal, the first data and the third data, and superimposing the first data over the third data to obtain the second data, wherein the first data, the second data and the third data are the same.

8. The method according to claim 1, wherein detecting the playing control instruction configured to indicate the application of the mobile terminal to play the source audio file comprises:

responsive to detection of a first selection operation for the source audio file of the mobile terminal, outputting a player selection interface comprising the application; and responsive to detection of a second selection operation for the application in the player selection interface, generating the playing control instruction configured to indicate the application to play the source audio file.

9. The method according to claim 1, wherein in response to determining that the at least one frame of the first data is mismatched with the at least one frame of the second data, disabling the global sound effect service comprises:

in response to determining that the at least one frame of the first data is different from the at least one frame of the second data, disabling the global sound effect service.

10. A mobile terminal, comprising a processor and one or more units stored on a memory and executable by the processor, the one or more units comprising:

a first acquisition unit, configured to, responsive to detection of a playing control instruction configured to indicate an application of a mobile terminal to play a source audio file, acquire at least one frame of first data generated in response to the mobile terminal processing the source audio file through a global sound effect service;

a second acquisition unit, configured to acquire at least one frame of second data in a current playing process of the application, wherein the at least one frame of the first data is a first frame data of the processed source audio file generated in response to the mobile terminal processing the source audio file through the global sound effect service, and the at least one frame of the second data is a first frame data acquired by the current playing process of the application, wherein in response to the application not being preset with an application-level sound effect parameter, the first data and the second data are the same;

a service disabling unit, configured to, in response to determining that the at least one frame of the first data is mismatched with the at least one frame of the second data, disable the global sound effect service; and a first playing control unit, configured to play a first audio file obtained by processing the source audio file according to the application-level sound effect parameter of the application.

11. The mobile terminal according to claim 10, wherein the first acquisition unit comprises:

a judgment unit, configured to determine whether the application belongs to a preset application set; and a third acquisition unit, configured to, in response to the judgment unit determining that the application does not belong to the preset application set, acquire the at least one frame of the first data generated in response to the mobile terminal processing the source audio file through the global sound effect service.

12. The mobile terminal according to claim 11, further comprising:

an application addition unit, configured to, after the service disabling unit disables the global sound effect service and before the playing control unit plays the first audio file obtained by processing the source audio file according to the application-level sound effect parameter of the application, add the application into the preset application set.

13. The mobile terminal according to claim 11, further comprising:

a second playing control unit, configured to, in response to the judgment unit determining that the application belongs to the preset application set, disable the global sound effect service and play the first audio file obtained by processing the source audio file according to the application-level sound effect parameter of the application.

14. The mobile terminal according to claim 10, further comprising:

a third playing control unit, configured to, in response to determining that the at least one frame of the first data is matched with the at least one frame of the second data, play a second audio file generated by processing the source audio file through the global sound effect service.

15. The mobile terminal according to claim 10, wherein on the aspect that the mobile terminal processes the source audio file through the global sound effect service, the first acquisition unit is configured to:

decode the source audio file into a reference audio file; and configure the reference audio file through the global sound effect service according to a pre-stored global sound effect parameter.

16. The mobile terminal according to claim 15, wherein the global sound effect parameter or the application-level sound effect parameter comprises at least one of the following parameters:

a Compress parameter, an Amp-Type (Amplifier-Type) parameter, an EQ_Bass parameter, an EQ_Mid parameter, an EQ_Treble parameter or a Noise_Gate parameter.

17. The mobile terminal according to claim 15, wherein the second acquisition unit is configured to, responsive to detection of the application being preset with the application-level sound effect parameter, configure the source audio file by using a sound effect configuration process or thread of the application according to the application-level sound effect parameter of the application to generate third data, acquire, through sound effect configuration service of the mobile terminal, the first data and the third data, and superimpose the first data over the third data to obtain the second data;

or, responsive to detection of the application not being preset with the application-level sound effect parameter, acquire the global sound effect parameter of the mobile terminal, configure the source audio file by using the sound effect configuration process or thread of the application according to the global sound effect parameter to generate the third data, acquire, through the sound effect configuration service of the mobile terminal, the first data and the third data, and superimpose the first data over the third data to obtain the second data, wherein the first data, the second data and the third data are the same.

18. The mobile terminal according to claim 10, wherein the first acquisition unit comprises a detection unit, and the detection unit is configured to, responsive to detection of a first selection operation for the source audio file of the mobile terminal, output a player selection interface comprising the application, and responsive to detection of a second selection operation for the application in the player selection interface, generate the playing control instruction configured to indicate the application to play the source audio file.

19. A non-transitory computer-readable storage medium, storing a computer program thereon, which in response to the computer program being executed by a computer, causes the computer to carry out one or more actions, the one or more actions comprising:
  responsive to detection of a playing control instruction configured to indicate an application of a mobile terminal to play a source audio file, acquiring at least one frame of first data generated in response to the mobile terminal processing the source audio file through a global sound effect service;
  acquiring at least one frame of second data in a current playing process of the application, wherein the at least one frame of the first data is a first frame data of the processed source audio file generated in response to the mobile terminal processing the source audio file through the global sound effect service, and the at least one frame of the second data is a first frame data acquired by the current playing process of the application, wherein in response to the application not being preset with an application-level sound effect parameter, the first data and the second data are the same;
  in response to determining that the at least one frame of the first data is mismatched with the at least one frame of the second data, disabling the global sound effect service; and
  playing a first audio file obtained by processing the source audio file according to the application-level sound effect parameter of the application.

20. The storage medium according to claim 19, wherein acquiring the at least one frame of the first data generated in response to the mobile terminal processing the source audio file through the global sound effect service comprises:
  determining whether the application belongs to a preset application set; and in response to determining that the application does not belong to the preset application set, acquiring the at least one frame of the first data generated in response to the mobile terminal processing the source audio file through the global sound effect service.

* * * * *